March 19, 1935.  C. WILSON  1,994,555
FRYING APPARATUS
Filed Aug. 27, 1927
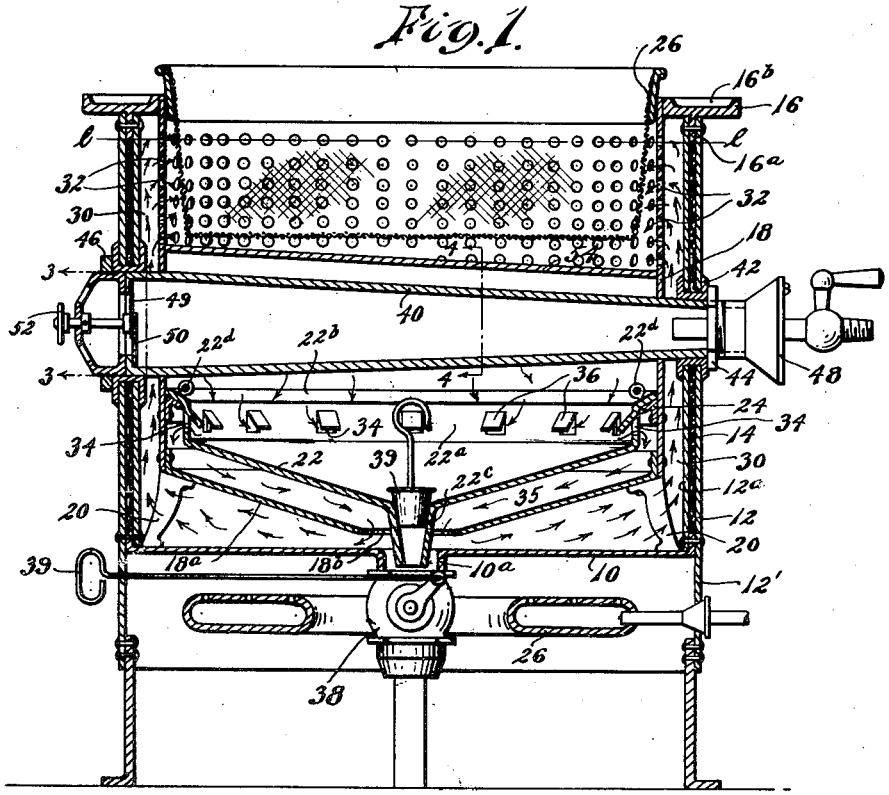
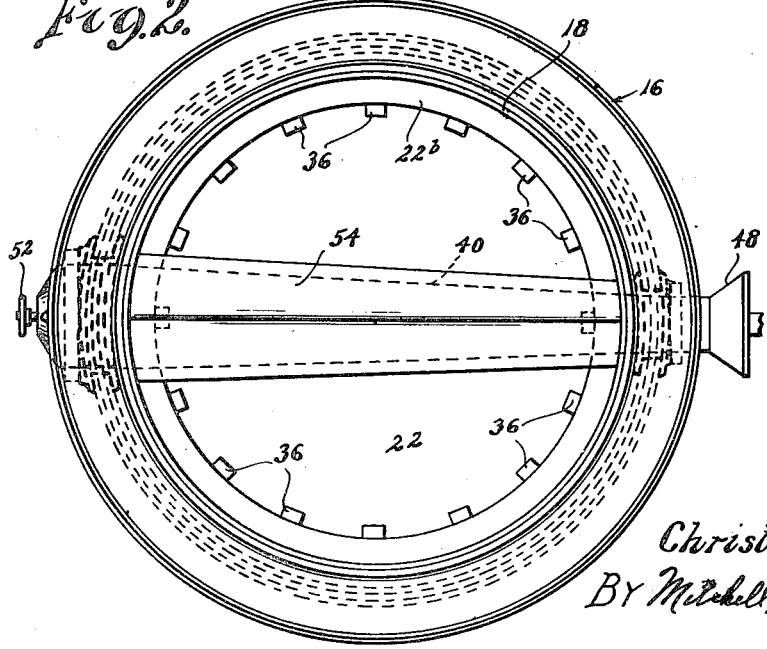
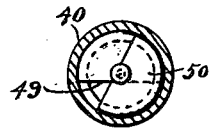
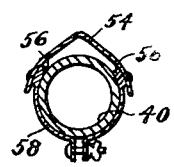
INVENTOR
Christian Wilson
BY Mitchell, Chadwick & Kent
ATTORNEYS.

Patented Mar. 19, 1935

1,994,555

UNITED STATES PATENT OFFICE 1,994,555

FRYING APPARATUS

Christian Wilson, North Revere, Mass.

Application August 27, 1927, Serial No. 215,912

27 Claims. (Cl. 53—7)

This invention relates to improvements in frying apparatus. More especially it relates to vessels or containers holding a supply of heated cooking liquid into which the food to be cooked is introduced in a perforated basket.

In cooking or frying food by immersion in hot grease or oil it is customary preliminarily to coat the food with meal or some suitable batter; and this during the process of frying is very apt to drop from the food into the cooking liquid. If permitted to settle upon the surfaces of the kettle which are near the fire, the meal itself becomes burned and soon spoils the cooking liquid. It has been found, however, that if the meal is kept from direct contact with the heated surfaces the liquid can continue to be used albeit a considerable quantity of the precipitated meal is still in the liquid.

The invention provides shields of one sort or another for keeping the meal and other matter deposited in the liquid from coming into contact with the directly heated surfaces of the vessel. It also provides means by which the liquid is heated primarily at the bottom and is thence conducted upward through an annular passage into the region of the food which is being cooked, and, when its heat units have been utilized in the cooking, is passed downward through a different course to the bottom where it can again be heated. It is a feature of the invention that the downward flowing liquid, which is relatively cooler than the upward flowing liquid, bathes the surface of the shield upon which the precipitated meal is caught and forms a sort of insulation for it from the bottom of the vessel and the highly heated liquid just above the bottom. The invention also provides for safe use of an auxiliary tubular heater of improved construction which extends through the liquid above the deposited meal and close by the material being cooked. This heater is likewise provided with a shield so that any meal falling from the food cannot come into contact with it or lodge upon it. In connection with this heater, it is a feature of the invention to provide a heating surface increasing in size from the burner end, so that the heating of the liquid may be substantially uniform across the vessel. It is also a feature that escape of the products of combustion from this heater can be regulated to make it noiseless and to make it a more efficient part of the apparatus. Other features will appear from the detailed description of the invention.

It is intended that the patent shall cover by suitable expression in the appended claims whatever features of patentable novelty exist in the invention disclosed.

In the accompanying drawings:

Figure 1 is an elevation in medial section of apparatus embodying the invention;

Figure 2 is a plan, with the frying basket removed;

Figure 3 is a section of a detail on line 3—3 of Figure 1; and

Figure 4 is a section through the auxiliary heater and shield, on line 4—4 of Figure 1.

Referring to the drawing the vessel or kettle, which may be of any convenient and suitable construction, is illustrated as having a bottom 10 with flanged edge inserted between two plates 12, 12$^a$ which, together with a filling of heat insulating material 14, constitute the side walls. At the top edge these plates are secured to a flange 16$^a$ depending from a wide rim 16 having a trough 16$^b$ on its top side. A cylindrical deflecting shell 18, of somewhat smaller diameter than the vessel stands within the latter on legs 20 resting on the bottom 10; and this has a converging bottom 18$^a$, a short distance above the vessel-bottom, sloping inward and downward toward the centre where it has an opening 18$^b$ for descending flow, close above the kettle bottom 10. A shield or collector 22 is mounted in this shell, with its bottom overlying the said opening and having its bottom dished downward, above which is a short vertical side wall 22$^a$ surmounted by an out-turned lip 22$^b$ that fits nicely against the shell and rests on lugs or brackets 24 on the shell at such a height that the shield is set at a little insulating space above the said converging bottom 18$^a$. The side wall 22$^a$ has perforations 34 protected by shields 36 sloping out above them, and these perforations permit out flow to the said insulating space 35. The food to be cooked is placed in a wire mesh basket 26, which may have tapered sides resting against the top edge of the shell 18, and whose body extends down into the vessel or kettle below the surface level 1—1 of a cooking liquid, such as oil, melted grease or the like. This cooking liquid is primarily heated by a burner 26 placed under the bottom 10, and within an apron 12' conveniently provided by extending the outer plate 12 downward beyond the bottom 10. This apron retards the flow of the products of combustion from the heater until the heat units have had time to heat the kettle bottom and the liquid lying next above it. This heated liquid tends to rise vertically upward but is deflected by the conical bottom 18$^a$ of the shell into the annular space 30 between the shell and the vessel's wall. From the upper portion of this space the hot liquid flows through openings 32 into the space where the food is supported and cooks or frys the latter. As its heat units are thus reduced and it becomes relatively cooler, the liquid descends but as the bottom of the shield arrests its descent it flows out sidewise through openings 34 in the short vertical wall 22ª of the shield, thence downward through the insulating space 35 between the bottom of the shield and the converging bottom 18ª of the shell, and down through the central opening 18ᵇ of the latter where it comes again into contact with the highly heated bottom of the vessel.

It has been discovered that so long as the cooking liquid remains clean it can be used repeatedly. The greatest source of trouble in keeping it clean is found in the particles of food and meal that drop into the liquid from the frying basket. If these food particles or meal rest upon the surfaces of the vessel where heat is being applied, they become burned and thereby injuriously affect the cooking liquid. The invention prevents this, because any heavy matter falling into the liquid is precipitated into and is caught by the shield 22, and cannot reach the heated bottom 10 of the vessel. To insure lodgment of the meal, for example, upon the shield, the openings 34 are through its side walls and are hooded. A simple expedient for covering these openings is disclosed in that metal punched inward from the side wall of the shield to make the opening is not cut along the top edge thereof but is merely pushed inward to an oblique position forming as it were a sort of awning or hood 36 over the opening. These hoods and the abrupt deflection of the liquid flow at the side openings 34 constitute a liquid clarifying device for separating suspended solids, especially those heavier than the liquid, which solids continue downward past the openings to settle upon the shield or catch basin 22, while the liquid turns sharply and flows out laterally into the space 35 between the shield and the conical bottom 18ª of the shell. The cooler liquid passing thru this space 35 bathes the under side of the shield and, together with the deflecting bottom 18ª of the shell, serves most efficiently to insulate the meal or food particles deposited within the shield, protecting them not only from the highly heated bottom 10 but also from the freshly heated liquid in contact therewith. Consequently there is no burning of the foreign matter in the liquid; and the liquid can be used indefinitely. When the shield has acquired a considerable deposit it is a feature of the invention that the clear liquid in the vessel can be first drawn off, and saved for use again, by opening the drain valve 38, this being easily done by pulling the hand rod 39. The withdrawal of this liquid leaves only a small quantity in the shield 22 below the level of the openings 34, and this remaining liquid together with most of the deposited meal on the shield 22 can then be removed by pulling the plug 39 from the funnel shaped outlet 22ᶜ that extends down into the space of the vessel's bottom outlet 10ª. If a more thorough cleaning is desired, the shell can be lifted out of the vessel and the shield removed therefrom, or the latter alone can be taken out by aid of the finger rings 22ᵈ. When returned to its position in the vessel, the drained liquid can be replaced and a fresh quantity added to bring its level to the proper height.

When it is desirable to have the liquid exceedingly hot, the invention provides for an auxiliary heater extending through the liquid close by the food basket. This auxiliary heater comprises a tapering tube 40 whose smaller end is drawn into a suitable gasket 42 in the wall of the shell and clamped therein by a nut 44 secured on the end of the tube. The other end of the tube extends through a similar gasket and is made tight therewith by another nut 46. A suitable burner 48 is mounted in the smaller end of the tube, that shown being of the torch type which projects a flame well into the tube. The large end of the tube is half closed by a fixed partition 49 across it and may be closed further by a rotatable valve or damper 50. By adjusting this damper, by means of the hand wheel 52, the escape opening through the large end of the tube can be regulated to retard the escape of the burned gases and also to eliminate the roaring sound of the torch flame. The tapering of the tube tends to make the heating effect on the liquid more uniform since as the flame spreads during its propagation the available heating surface of the tube in contact with the liquid is greater, hence the quantity of heat units absorbed by the liquid is substantially the same as at the smaller end where the heating surface of the tube is smaller and at higher temperature.

To prevent the meal or food particles from falling on the auxiliary heater, the invention provides a shield 54 above it which extends along the top of the heater from one side of the shell 18 to the other. This shield has a sharp ridge with sides sloping downward therefrom past the center line of the tube (see Fig. 4). Suitable feet 56 inside the shield space it from the heater; the forming of its ends to fit the curving wall of the shell 18 prevents the shield from slipping around the tube. If desired, a clamping strap 58 may extend around the tube from the feet 56 of the shield and hold the shield securely in place. When a vessel equipped with the auxiliary heater is to be cleaned, the shield 54 and heater 40 are removed, after which the shell 18 and shield 22 can be taken out as previously described.

The invention enables the freshly heated liquid to flow directly into contact with the food, the natural upward circulation being controlled so that the liquid percolates through the openings 32, striking the food simultaneously from all sides. The precipitated meal is kept from contact with the directly heated surfaces of the kettle and the hot liquid next to the bottom, and consequently the liquid remains clear and clean. All this makes for efficiency both in the quantity of cooking liquid used and in the amount of fuel consumed for heating. The apparatus is sanitary and can be easily cleaned. The trough in the top rail catches and retains any drippings and prevents their return to the liquid in the vessel.

I claim as my invention:

1. Frying apparatus comprising, in combination, a vessel for holding liquid for cooking food, having a wall exposed on one side to a source of heat and exposed on the other side to said liquid, the place for food which is being cooked being above said wall and there being a continuous passage for liquid from said wall upward along a side of the vessel; and means interposed between said wall and the place of said food, for arresting the progress, to contact with the wall, of matter precipitated from the food.

2. Frying apparatus comprising, in combination, a vessel for holding liquid for cooking food, having a wall exposed on one side to said liquid, the place for food which is being cooked being above said wall, and there being a continuous passage for liquid from said wall upward along a side of the vessel; and a shield interposed between said wall and the place of said food, for arresting the progress, to contact with the wall, of matter precipitated from the food.

3. Frying apparatus comprising, in combination, a vessel for holding liquid for cooking food, having a wall exposed on one side to a source of heat and exposed on the other side to said liquid, the place for food which is being cooked being above said wall, and there being a continuous passage for liquid from said wall upward along a side of the vessel; and a clarifying device for the liquid interposed between said wall and the place of said food, for arresting the progress, to contact with the wall, of matter precipitated from the food.

4. Frying apparatus comprising, in combination, a vessel for holding cooking liquid, having a bottom exposed to a source of heat; the place for food which is being cooked being above said bottom; means in said vessel, below the place for food and above said bottom, for collecting precipitation from said food; there being provision for said liquid to circulate from said bottom upward past the edge of said collecting means to the food and thence to return to said bottom through said collecting means.

5. Frying apparatus comprising, in combination, a vessel holding cooking liquid; a heater under the bottom of said vessel; an auxiliary heater extending through the liquid, between the bottom and the place for food which is being cooked; and means for shielding the auxiliary heater and said bottom from precipitation from said food.

6. Frying apparatus comprising, in combination, a vessel holding cooking liquid and adapted to receive heat through its bottom; a shell within said vessel having its side wall and bottom spaced from the side wall and bottom of the vessel, and having an opening through its wall near its top and another opening through its bottom; the place for food which is being cooked being in the liquid opposite said top opening; the said shell being a guide causing the freshly heated liquid at the bottom to circulate upward outside of the shell and through its top opening to the food and, after loss of heat, thence downward through the shell and through its bottom opening to the bottom of the vessel.

7. Frying apparatus comprising, in combination, a vessel holding cooking liquid and adapted to receive heat through its bottom; the place for food which is being cooked being at the top; means within said vessel for directing the heated liquid upward along the sides of said vessel, at the top letting it inward to the food, and thence letting it downward to the bottom; and a trap on the downward passage for precipitation from said food.

8. Frying apparatus comprising, in combination, a vessel for holding cooking liquid, having a bottom exposed to a source of heat; the place for food which is being cooked being at the top; and a shield for the bottom within said vessel, arranged to collect precipitation from said food, and providing a passage for heated liquid from the bottom upward outside of the shield and downward through the shield; there being openings in said shield for lateral passage of the liquid and protectors for said openings whereby the precipitation falls away therefrom without passing therethrough.

9. Frying apparatus comprising, in combination, a vessel for holding liquid in which food is cooked at the top; heating means for said liquid comprising a tube extending across said vessel through the liquid below the top; a burner at one end of said tube; and a valved outlet at the other end of said tube, controlling the rate of escape of the burned gases therefrom thereby to vary the heating effect on said liquid.

10. Frying apparatus comprising, in combination, a vessel for holding cooking liquid in which food is cooked at the top; heating means for said liquid comprising a tapered tube extending through said liquid below the top and between the side walls of the vessel; a burner at the smaller end of the tube and a damper across the larger end of the tube whereby the escape of the products of combustion from said tube may be regulated.

11. Frying apparatus comprising, in combination, a vessel for holding liquid for cooking food, adapted for receiving heat through its bottom, the place for food which is being cooked being at the top; an interior bottom, spaced from the bottom of the vessel and adapted and positioned to catch precipitation from the food; and means guiding the circulation of liquid within the vessel so that between the two said bottoms the downward flowing and less heated liquid intervenes between the said interior bottom and the freshly heated liquid which is at the bottom of the vessel.

12. Frying apparatus comprising in combination a vessel for holding liquid for cooking food, adapted to receive heat through its bottom, the place for food which is being cooked being at the top; a shell within the vessel, with sides and bottom respectively spaced inward from the sides and bottom of the vessel; the bottom of the shell having a central hole and the top of the shell being adapted for liquid to flow from its outside to the place for food; and a receptacle within the shell, having an imperforate bottom spaced a little above the bottom of the shell and adapted to hold precipitation from the food, and having sides spaced a little inward from the said shell sides; the whole providing passages for the liquid to flow from the bottom upward outside of the shell and thence at its top to the food, and to flow from the food downward to and through the space between the receptacle and the shell and thence through the bottom opening of the shell to the bottom of the vessel; there being means for separating from the flowing liquid the precipitation from the food, in position for said precipitation to gather in said receptacle.

13. Frying apparatus comprising in combination a vessel for holding liquid for cooking food, having a wall exposed externally to a source of heat and exposed internally to said liquid, the place for food which is being cooked being above said wall, and there being a continuous passage for liquid from said wall upward along a side of the vessel; means guiding the flow of liquid heated by said wall; and means separating from said flowing liquid the precipitation from the food.

14. Frying apparatus comprising, in combination, a vessel for holding liquid for cooking food; means in said vessel for collecting precipitation from said food; means at the bottom of said vessel for draining separately said liquid and said precipitation from the vessel.

15. Frying apparatus comprising, in combination, a vessel for holding liquid for cooking food, having a valved outlet at the bottom; means in said vessel above said bottom for collecting precipitation from said food and having a discharge outlet extending into the valved outlet of the vessel but spaced therefrom to permit the liquid to be withdrawn from the vessel; and means controlling the discharge outlet from said collecting means whereby it can be opened to permit drainage of the precipitation through the valved outlet from the vessel.

16. In a device of the character specified, the combination of a kettle, means for applying heat to said kettle upon a limited area thereof, and a member mounted within said kettle and adapted to collect and deposit the debris of cooking at a point remote from the area of application of heat to said kettle.

17. In a device of the character specified, the combination of a kettle, means for applying heat to said kettle upon a limited area thereof, and a member removably mounted within said kettle and adapted to collect and deposit the debris of cooking at a point remote from the area of application of heat to said kettle.

18. In a device of the character specified, the combination of a kettle, means for applying heat to said kettle upon a limited area thereof, a member mounted within said kettle and adapted to collect and deposit the debris of cooking at a point remote from the area of application of heat to said kettle, and means for withdrawing said debris.

19. In a device of the character specified, the combination of a kettle provided with a hole in the base thereof, means for applying heat to said kettle adjacent the periphery of the base thereof, a funnel shaped member mounted within said kettle the neck of which member communicates with said hole in said kettle, said funnel shaped member being provided with holes, and a draw-off valve mounted in the base of said kettle and communicating with the hole therein.

20. Deep-liquid cooking apparatus comprising a kettle having an outlet at the base thereof, and having a base portion adapted exteriorly to be heated for the heating of the contents of said kettle, combined with an internal shield tapering from near the side wall of the kettle to said outlet.

21. Deep-liquid cooking apparatus comprising a kettle whose lower part is adapted to be heated externally for the heating of the contents of the kettle and an internal shield extending obliquely upward from near the base of the kettle, to near the side wall thereof, and forming an acute angle with said side wall, and bridging across the space from a central region of the bottom to said side wall; the kettle wall underneath said bridged space being the said part adapted to be externally heated.

22. Deep-liquid cooking apparatus comprising a kettle adapted to be heated at its lower portion; a cooking basket for its upper portion; and a shield, within and extending crosswise of the kettle below the part thereof which is adapted to receive the cooking basket; said shield having interior surface adapted to intersect and deflect debris falling from food in the basket; and having its exterior surface a deflector and guide for cooking liquid which is heated and rising within the kettle.

23. Deep-liquid cooking apparatus comprising a kettle, a cooking basket therein, an internal shield, set below the basket and tapering at an acute angle from the side wall of the kettle downward and inward; said shield being arranged for retaining settlings of food debris in the low interior region, apart from the exterior wall of the kettle, and having escape passage for liquid from its interior to the exterior wall for the re-heating of said liquid.

24. Deep-liquid cooking apparatus comprising a kettle having an opening in its bottom portion; a tapered shield mounted in said kettle and adapted to aline itself axially with said opening; and means associated with said shield for preventing debris from passing into said opening.

25. Deep-liquid cooking apparatus comprising a kettle having a draw-off opening at the base thereof, an internal shield tapering toward said draw-off opening and having an opening at its lower end, and a plug for closing the opening in said shield.

26. Deep-liquid cooking apparatus comprising a kettle, an internal shield, whose under side has a taper extending inward and downward from near the side wall of the kettle to a centrally located debris trap, the lower part of the shield being formed to retain debris in said trap, through which shield are openings adapted to permit the cooking medium to circulate out from the lower part of said shield at a location separate from that of the debris trap.

27. Deep-liquid cooking apparatus comprising a vessel and a shield therein, the shield having side walls which enclose a cooking chamber for reception of material to be cooked, said shield walls being spaced inward from the walls of the vessel; there being about the cooking chamber a free upward passage in said space between the said shield walls and vessel walls; and there being upper and lower openings in the said shield, both of which openings connect the cooking chamber with said passage.

CHRISTIAN WILSON.